FIP8106 OR 3,729,633

United States Patent [19]

Eros et al.

[11] 3,729,633

[45] Apr. 24, 1973

[54] OPTICAL RECEIVER HAVING A MAXIMIZED SIGNAL-TO-NOISE RATIO

[75] Inventors: Stephen Eros, Gaithersburg; Paul M. Thrasher, Bethesda, both of Md.

[73] Assignee: International Business Machines Corporation, Armonk, N.Y.

[22] Filed: Nov. 24, 1970

[21] Appl. No.: 92,394

[52] U.S. Cl. ..................250/199, 250/200, 325/323, 325/477, 325/488, 325/489, 329/144, 330/157

[51] Int. Cl. ..............................................H04b 9/00

[58] Field of Search......................250/199, 200, 233, 250/83.3 R, 83.3 H; 329/144; 330/33, 157, 180; 324/96, 97; 325/323, 477, 488–490; 179/1 VC, 15 AA

[56] References Cited

UNITED STATES PATENTS

| | | | |
|---|---|---|---|
| 3,286,031 | 11/1966 | Geddes | 179/1 VC |
| 3,646,265 | 2/1972 | Eberhardt | 325/323 |
| 3,470,423 | 9/1969 | Larew | 330/33 |
| 3,389,341 | 6/1968 | Thomas | 250/199 |

*Primary Examiner*—Albert J. Mayer
*Attorney*—Hanifin and Jancin and Thomas F. Galvin

[57] ABSTRACT

A method of maximizing the signal-to-noise (S/N) ratio or a direct-detecting optical pulse receiver for an input pulse having a well-defined duration and receiver apparatus derived therefrom. The S/N ratio is defined as the ratio of the signal output peak instantaneous power to the noise output mean power. The optical receiver comprises an optical detector with fast-response, high-sensitivity characteristics followed by a cascade arrangement of amplifiers, two RC dividing networks, one low pass and the other high pass and an amplitude detector. The noise sources comprise the quantum noise generated within the input light-sensitive device and the thermal noise generated within the input load resistor of the device.

The dividing networks form a bandpass filter which is designed to maximize the S/N ratio. As a result, the time constants of the filters turn out to be substantially equal and the output load resistance of the detector is set as high as is practical. The method achieves a S/N ratio approaching that obtainable with an ideal matched filter for small values of the input pulse width ($t_o$), e.g., of the order of 10 nanoseconds. The S/N ratio improvement over prior art receivers is in the order of 20 db. The receiver is especially effective when $t_o$ is less than 1 microsecond.

1 Claim, 8 Drawing Figures

Patented April 24, 1973 3,729,633

3 Sheets-Sheet 1

INVENTORS
STEPHEN EROS
PAUL M. THRASHER

BY Thomas F. Galvin

AGENT

OPTICAL RECEIVER HAVING A MAXIMIZED SIGNAL-TO-NOISE RATIO

BACKGROUND OF THE INVENTION

This invention relates to optical communications systems. In particular it relates to a receiver for detecting optical pulses which have well-defined pulse widths which are characteristic of laser transmission systems.

The cancellation or suppression of noise in optical receivers has received a great deal of attention in recent years. Many applications depend on the ability of the detector to respond to vanishingly small quantities of radiation which are characterized by low current levels and short pulse widths. This is particularly important in the fields of optical communication, optical instrumentation and Raman spectroscopy.

Prior to the present invention, the principal means used to detect optical pulses were direct-detection optical receivers or heterodyne-type optical communication receivers. The heterodyne receiver has been recognized as more noise-immune than the direct-detection receiver; on the other hand, the heterodyne receiver is quite a bit more complex. As a result, the direct-detection optical receiver is usually to be preferred over a heterodyne receiver. However, the S/N ratio of the input light pulses in direct-detecting receivers remains a significant problem. Furthermore, this problem worsens as the ability to generate coherent pulses of very short duration improves. See, for example, the article on Optical Receivers by V. K. Prabhu in *Applied Optics*, Vol. 7, No. 12, pp 2,401–08, December 1968.

For a maximum S/N ratio in direct-detecting receivers, it is well known that $t_o$, the duration of the input pulse, should be equal to 1.26 RC, where RC is the time constant of the receiver. If $t_o$ becomes smaller, then the bandwidth of the receiver must increase and either R or C must be decreased. But C is usually limited by the capacitance of the photodetector and other system capacitances. The latest semiconductor detectors, for example, have a minimum capacitance in the order of picofarads, primarily due to the junction capacitance.

Because of the fixed capacitance (C), the load resistance (R) of the detector must be reduced if the bandwidth is to be increased. However, the S/N ratio of a receiver having a large bandwidth is generally proportional to R; and the S/N ratio is correspondingly reduced as R is reduced. In the past, when relatively long pulses were standard, a high S/N ratio was ensured merely by adhering to the criterion $t_o = 1.26$ RC, allowed R to be set large enough. However, as already explained, the advent of shorter duration input pulses requires R to be small in receivers designed for optical detection. Designers in this field have been unable to solve this dilemma.

SUMMARY OF THE INVENTION

It is therefore an object of this invention to improve the detection of optical pulses.

It is a further object of this invention to detect optical pulses having very narrow pulse widths by an apparatus which is less expensive and more practical than prior art receivers.

It is another object of this invention to improve the signal-to-noise ratio of a laser receiver.

These and other objects are achieved in a laser receiver basically comprising a direct-detecting photodetector and a bandpass filter connected to its output. The load resistance, $R_1$, of the detector is designed to be large enough to substantially maximize the term $(R_1/I_o e' R_1 + 2kT)$, where $I_o$ is the D.C. current through the photodetector, $e'$ is the charge on the electron, $k$ is Boltzman's constant and $T$ is the absolute temperature of the photodetector. R is thereby made large, especially for small values of $I_o$; and the photodetector itself is a low-pass filter.

The bandpass filter comprises a low-pass and high-pass filter in cascade. The filters are constructed so that their time constants are substantially equal to each other and designed to maximize the signal-to-noise relationship:

(1)

$$S/N = A^2 \frac{2R_1}{I_0 e' R_1 + 2kT} \frac{(\alpha+\beta)(\alpha+\gamma)(\beta+\gamma)}{(\alpha-\beta)^2(\alpha-\gamma)^2(\beta-\gamma)^2} \left[\alpha(\beta-\gamma)e^{-\frac{t_{max}}{\alpha}} - \beta(\alpha-\gamma)e^{-\frac{t_{max}}{\beta}} + \gamma(\alpha-\beta)e^{-\frac{t_{max}}{\gamma}}\right]^2$$

where: $A$ is the amplitude of the input optical current pulse; $I_o$, $e'$, $R_1$, $k$ and $T$ are as previously defined; $\alpha$, $\beta$ and $\gamma$ are the time constants of the photodetector, and the high- and low-pass filters of the bandpass filter, respectively; and $t_{max}$ is the time at which the output signal is at its maximum. It turns out that $t_{max}$ equals $t_o$ for the great majority of cases and that $t_{max}$ $t_{max}$ $\leq$ $t_o$ for all cases.

Equation 1 is the result of a process to describe the S/N ratio in terms of the receiver parameters. It is derived from the basic relationship:

(2)

$$S/N = \frac{\frac{(\text{peak signal output voltage})^2}{\text{output load resistance}}}{\text{output noise power}}$$

The procedure for determining the values of $R_1$ and the time constants, $\beta$ and $\gamma$, of the bandpass filter is as follows.

First, an equation for the peak value of the output signal voltage, termed $v_o$(max), is determined and inserted in the numerator of equation 2. Second, equations for the output noise power of the receiver, which consists of the thermal and quantum noise, are determined and inserted in the denominator of equation 2. This establishes equation 1. The output load resistance is assumed to be 1 ohm, for ease of computation.

Analysis of equation 1 indicates that the S/N ratio is maximized when $R_1$ is selected to substantially maximize the term $(R_1/I_o e' R_1 + 2kT)$ and when the time constants of the low-pass and high-pass filters of the bandpass filter are set equal and selected to maximize the equation.

Compared with direct-detecting receivers having only a post-detection, low-pass filter to limit amplifier noise, the S/N ratio of the inventive receiver is substantially improved, as will be demonstrated.

BRIEF DESCRIPTION OF THE DRAWINGS

The invention will be more fully understood by referring to the following detailed description taken in connection with the accompanying drawings, forming a part thereof, in which:

Referring now to FIG. 1, there is shown the equivalent circuit of the optical receiver of the present invention. The input light-sensitive device 10 takes the equivalent form of capacitor $C_1$ and resistor $R_1$ fed by a current source denoted as $I_{in}(s)$. The capacitor $C_1$ represents the junction capacitance of the device plus any shunting capacitances. The resistor $R_1$ is the load resistance of the device shunted by the very high junction resistance of the device. For practical purposes $R_1$ is regarded as the load resistance alone. This type of equivalent circuit is well known to those of skill in the art as representing standard light-sensitive devices. For example, device 10 may be a small area, silicon photodiode. Input current pulse 8 has a duration of $t_o$ seconds.

Figure 1:
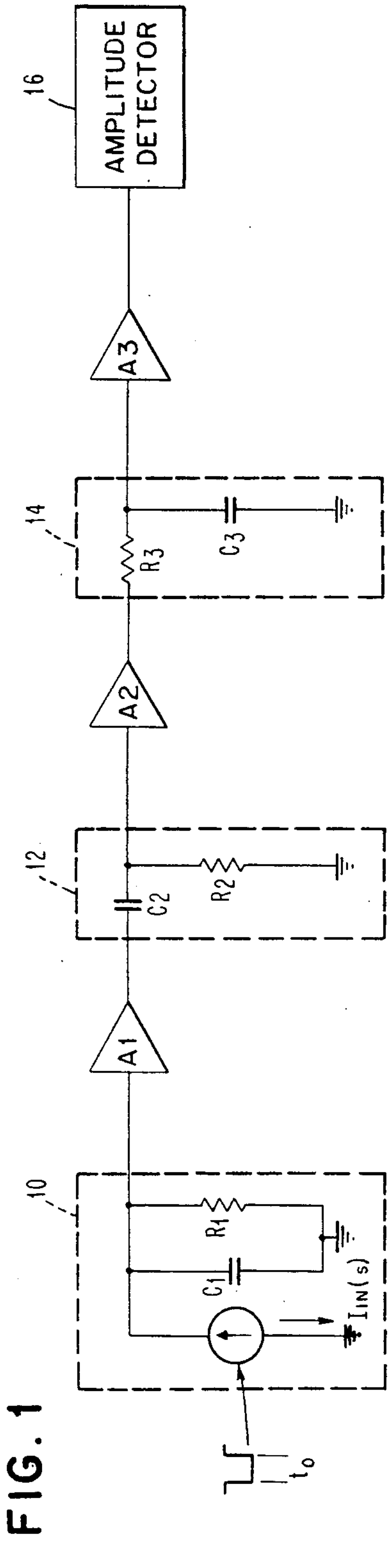
FIG. 1 is a schematic drawing of the optical receiver of the present invention.

The output of device 10 is connected to amplifier $A_1$. The output of amplifier $A_1$ is connected to voltage divider 12 which consists of a RC circuit where the capacitance is denoted as $C_2$ and the resistance is denoted as $R_2$. As will be completely described later, divider 12 is a high-pass filter. The output of filter 12 is connected to amplifier $A_2$. The output of amplifier $A_2$ is connected to voltage divider 14 which consists of capacitor $C_3$ and resistor $R_3$. Divider 14 is a low-pass filter whose characteristics will also be described later. The output of divider 14 is connected to amplifier $A_3$. The output of amplifier $A_3$ is connected to a standard amplitude detector 16.

Each of amplifiers $A_1$, $A_2$, and $A_3$ shown in FIG. 1 have high-input impedance, low-output impedance, a flat frequency response and gain factors $K_A$, $K_B$ and $K_C$, respectively. The noise contributed by the amplifiers is assumed to be negligible. Even in the presence of significant amplifier noise, however, the inventive method will yield a substantial improvement in S/N ratio for small pulse widths. In the present circuit the characteristics as outlined for the amplifiers insure that their inputs do not load the preceding circuit; their outputs act as voltage sources; the overall frequency characteristics are determined by the specific R and C elements of circuits 10, 12 and 14; and the only noise sources are those due to the input circuit to the first amplifier, i.e., device 10.

The transfer functions in Laplace Transform notation of each of the components of FIG. 1 are easily calculated by those of skill in the art and the calculations will not be described here. For example, the transfer function, $H_1(s)$, of the device 10 equals $$\frac{1}{C_1\left[s+\frac{1}{R_1C_1}\right]}$$

and the Laplace Transform of the input signal, $I_{in}$, equals $$\frac{A(e^{-st_o}-1)}{s}.$$

Peak Value of the Output Voltage

In the circuit shown in FIG. 1, the output voltage $V_o$ is, by standard linear network analysis:

$$(3)\quad V_o(s) = \frac{I_{in}(s)K_AK_BK_C}{C_1C_3R_3}\cdot\frac{s}{\left(s+\frac{1}{R_1C_1}\right)\left(s+\frac{1}{R_2C_2}\right)\left(s+\frac{1}{R_3C_3}\right)}$$

In the preferred embodiment, the input signal current $i_{in}$ is defined as a negative rectangular pulse of amplitude $-A$ and a well-defined width $t_o$. To write $i_{in}$ as a function of $s$, the negative rectangular pulse is formed by superimposing two step functions of opposite polarity, the positive function being displaced in time by $t_o$. Then:

$$(4)\quad i_{in}(t) = -A\cdot U(t) + A\cdot U(t-t_o);\text{ and}$$

$$I_{in}(s) = (A/s)\,(e^{-st_o}-1)$$

Substituting for $I_{in}(s)$, equation 3 then becomes:

$$(5)\quad V_0(s) = A\cdot\frac{K_AK_BK_C}{C_1C_3R_3}\cdot\frac{e^{-st_0}-1}{\left[s+\frac{1}{R_1C_1}\right]\left[s+\frac{1}{R_2C_2}\right]\left[s+\frac{1}{R_3C_3}\right]}$$

The inverse transform of $V_o(s)$ in equation 5 is:

$$(6)\quad -v_0(t) = A\cdot K_AK_BK_C\,\frac{1}{C_1}\,\frac{\alpha\beta}{(\alpha-\beta)(\alpha-\gamma)(\beta-\gamma)}\Big[\alpha(\beta-\gamma)e^{\frac{-t}{\alpha}}-\beta(\alpha-\gamma)e^{\frac{-t}{\beta}}+\gamma(\alpha-\beta)e^{\frac{-t}{\gamma}}$$
$$-U(t-t_0)\alpha(\beta-\gamma)e^{\frac{-t+t_0}{\alpha}}+U(t-t_0)\beta(\alpha-\gamma)e^{\frac{-t+t_0}{\beta}}$$
$$U(t-t_0)\gamma(\alpha-\beta)e^{\frac{-t+t_0}{\gamma}}\Big]$$

where, for notational convenience, the time constants of device 10 and dividers 12 and 14 of FIG. 1 are denoted as follows:

$$R_1C_1=\alpha,\ R_2C_2=\beta,\text{ and } R_3C_3=\gamma.$$

Figure 2:
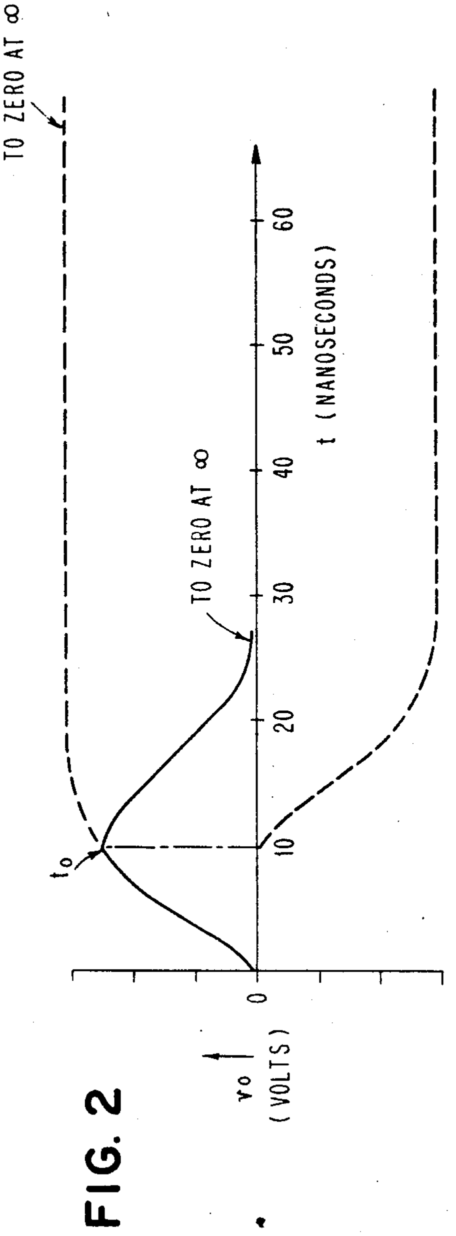
FIG. 2 is a graph of the output voltage of the receiver in FIG. 1 versus time for a given input pulse width, $t_o$.

The maximum value of equation 6, termed $v_o(\max)$, is to be used in the numerator of equation 2. Because only this maximum value of $v_o(t)$ is desired, equation 5 can be further simplified by noting that $t_{max}$, the time at which $v_o(\max)$ occurs, must always be $\leq t_o$. Hence, the last three terms in equation 6 are not required to determine $v_o(\max)$. To see this, first note that at $t = t_o$ the last three terms vanish because $$e^{\frac{-t+t_0}{\alpha}},\ e^{\frac{-t+t_0}{\beta}}\text{ and } e^{\frac{-t+t_0}{\gamma}}.$$

each equal one for $t = t_o$ and the terms $-\alpha(\beta-\gamma)+\beta(\alpha-\gamma)-\gamma(\alpha-\beta)$ then cancel each other. Second, at $t < t_o$, the last three terms vanish because $U(t-t_o) = 0$ for $t < t_o$. Finally, for $t > t_o$, equation 6 can be considered to consist of two parts, the first three terms and the second three terms. The second three terms represent a function that is a duplicate of that represented by the first three, but opposite in polarity and shifted to the right by $t_o$. This may be seen in FIG. 2 which is a graph of the output voltage $v_o$ versus time for equation 6. The input pulse duration in this example is selected to be 10 nanoseconds and the values of the other parameters are arbitrarily selected. The portions of the curves shown by dotted lines on the positive and negative side of the t axis represent positive and negative step function responses, respectively, to the input signal. The positive response in FIG. 2 is due to the first three terms of equation 6; it is counteracted, after $t = t_o$, by the negative response which is due to the last three terms of equation 6. The total output is denoted by a heavy line and the maximum output voltage in this example occurs precisely at $t = t_o$.

Therefore, it may be seen from FIG. 2 that $v_o(t)$ is monotonically decreasing at $t_o$; and $v_o(t > t_o)$ must always be less than $v_o(t_o)$. So, $v_o(\max)$ can occur only for values of $t \le t_o$ and the last three terms of equation 6 can be ignored when calculating $v_o(\max)$. Equation 6 is then simplified and written as:

(7)

$$-v_0(\max) = A \cdot K_A K_B K_C \frac{1}{C_1} \frac{\alpha\beta}{(\alpha-\beta)(\alpha-\gamma)(\beta-\gamma)} \left[ \alpha(\beta-\gamma) e^{\frac{-t_{max}}{\alpha}} - \beta(\alpha-\gamma) e^{\frac{-t_{max}}{\beta}} + \gamma(\alpha-\beta) e^{\frac{-t_{max}}{\gamma}} \right]$$

where $t_{max} \le t_o$

Equation 7 is the expression that is to be used in the numerator of the S/N ratio given in equation 2.

It will be noted that equation 7 is indeterminate at $\alpha = \beta$, $\alpha = \gamma$ or $\beta = \gamma$. However, application of L'Hopital's Rule indicates that the function is continuous for these values.

In the great majority of practical cases, $v_o(\max)$ occurs precisely at $t = t_o$, i.e., $t_{max} = t_o$. However, for input pulses of long duration, $v_{max}$ may occur at some value of $t_{max} < t_o$. A procedure for determining $t_{max}$ is described in a later section of this specification.

Output Noise Power

1. Quantum Noise

The input RMS quantum or shot noise current, $I_{QN}$, may be expressed in terms of the well-known formula stated, e.g., in the textbook, *Noise*, A. Van der Ziel, Prentice-Hall, 1954, as follows:

(8) $I_{QN} = \sqrt{2I_o e' \Delta f}$ where:

$I_o$ is the average D.C. current, $e'$ is the charge on the electron, the subscript QN denotes quantum noise, and $\Delta f$ is the bandwidth of the signal.

In this case, $I_o$ is a function of the background noise, the D.C. component of the signal and the dark current of the photodiode. The spectral distribution for this input current is white. To develop the expression for the output quantum noise power, we begin with the previously stated equation for output voltage, equation 3, and express it in terms of $(j\omega)$ for $(s)$ and $I_{QN}$ for $I_{IN}$. Equation 3 then becomes:

(9)

$$v_o(j\omega) = \left[ \sqrt{2I_o e' \Delta f}\, K_A K_B K_C R_1 R_2 C_2 \frac{j\omega}{(1+j\omega R_1 C_1)(1+j\omega R_2 C_2)(1+j\omega R_3 C_3)} \right]$$

The total output quantum-noise power, $P_{QN}$, assuming that this voltage is delivered to a $1\Omega$ load, becomes:

(10)

$$P_{QN} = \left[ 2I_o e' (K_A K_B K_C R_1 R_2 C_2)^2 \int_0^\infty \left[ \frac{j\omega}{(1+j\omega R_1 C_1)(1+j\omega R_2 C_2)(1+j\omega R_3 C_3)} \right]^2 df \right]$$

Multiplying the integrand through by complex conjugate factors for each of the denominator factors in the integrand, and separating into real and imaginary parts:

(11)

$$P_{QN} = \left[ 2I_o e' K_1^2 \int_0^\infty \left[ \frac{(-\omega^4 K_2 + \omega^2 K_3) + j(-\omega^3 K_4 + \omega)}{(1+\omega^2 R_1^2 C_1^2)(1+\omega^2 R_2^2 C_2^2)(1+\omega^2 R_3^2 C_3^2)} \right]^2 df \right]$$

where: $K_1 = K_A K_B K_C R_1 R_2 C_2$; $K_2 = R_1 C_1 R_2 C_2 R_3 C_3$; $K_3 = R_1 C_1 + R_2 C_2 + R_3 C_3$; and $K_4 = R_1 C_1 R_2 C_2 + R_1 C_1 R_3 C_3 + R_2 C_2 ab3 C_3$. Equation 11 becomes:

(12)

$$P_{QN} = \frac{I_o e'}{\pi} \cdot K_1^2 \left[ K_2^2 \int_0^\infty \frac{\omega^8}{(\mathrm{DENOM})^2} d\omega + (K_4^2 \quad 2K_2 K_3) \int_0^\infty \frac{\omega^6}{(\mathrm{DENOM})^2} d\omega + (K_3^2 - 2K_4) \int_0^\infty \frac{\omega^4}{(\mathrm{DENOM})^2} d\omega + \int_0^\infty \frac{\omega^2}{(\mathrm{DENOM})^2} d\omega \right]$$

where $\mathrm{DENOM} = (1+\omega^2 R_2^2 C_2^2)(1+\omega^2 R_3^2 C_3^2)$

Equation 12 must be evaluated. The right-hand side involves an integral of the general form:

(13)

$$\int_0^\infty \frac{X^n}{(1+R_1^2 C_1^2 X^2)^2 (1+R_2^2 C_2^2 X^2)^2 (1+R_3^2 C_3^2 X^2)^2} dx$$

where n = 2, 4, 6, 8.

An integral of this form may be evaluated by residues using conventional contour integration techniques. To use this method integral 13 is written in the form:

(14)

$$\left[ \frac{1}{(R_1^2 C_1^2 R_2^2 C_2^2 R_3^2 C_3^2)} \int_0^\infty \frac{X^n}{\left(x^2 + \frac{1}{(R_1 C_1)^2}\right)^2 \left(x^2 + \frac{1}{(R_2 C_2)^2}\right)^2 \left(x^2 + \frac{1}{(R_3 C_3)^2}\right)^2} d\omega \right]$$

The integral is considered to be a function of a complex variable and is evaluated around a semi-circle, extending from 0 to R, then to −R along the semi-circle and back to zero, with R being allowed to go to ∞. This integral is set equal to $2\pi i$ multiplied by the sum of the residues. Because, for $n$ = 2, 4, 6, 8, the function is even, the integral may be written as:

(15)

$$\int_0^\infty \frac{x^n}{\left(x^2+\frac{1}{(R_1C_1)^2}\right)^2\left(x^2+\frac{1}{(R_2C_2)}\right)^2\left(x^2+\frac{1}{(R_3C_3)^2}\right)^2}\,dx$$

case. It may readily be seen that when this is done the final result is:

(19)

$$P_{TN}=\frac{kT}{R_1}\,\frac{(K_AK_BK_CR_1\beta)^2}{(\alpha+\beta)(\alpha+\gamma)(\beta+\gamma)}$$

This is the expression for the thermal noise portion of the denominator of the overall S/N ratio defined in equation 2.

Overall S/N Ratio

The equations calculated in Steps I and II for $v_o$(max), $P_{QN}$ and $P_{TN}$ are now inserted into equation 2 to obtain the following overall result:

(20)

$$S/N=\left[A^2\,\frac{2R_1}{I_oe'R_1+2kT}\,\frac{(\alpha+\beta)(\alpha+\gamma)(\beta+\gamma)}{(\alpha-\beta)^2(\alpha-\gamma)^2(\beta-\gamma)^2}\left[\alpha(\beta-\gamma)e^{\frac{-t_{max}}{\alpha}}-\beta(\alpha-\gamma)e^{\frac{-t_{max}}{\beta}}+\gamma(\alpha-\beta)e^{\frac{-t_{max}}{\gamma}}\right]^2\right]$$

$=2\pi i\,\Sigma$ residues.

The term $2\pi i\,\Sigma$ residues is to be evaluated, where the poles enclosed by the contour are: $Z_1=(i/R_1C_1)$, $Z_2=(i/R_2C_2)$, and $Z_3=(i/R_3C_3)$.

This evaluation is done for each value of $n$, with $x$ set equal to $\omega$. Equation 12 reduces to:

(16)

$$P_{QN}=\frac{I_oe'}{\pi}K_1^2\,\frac{\pi/2}{(R_1C_1+R_2C_2)(R_1C_1+R_3C_3)(R_2C_2+R_3C_3)}$$

The above equation may be written in simpler form as:

(17)

$$P_{QN}=\frac{I_oe'}{2}\,\frac{(K_AK_BK_CR_1\beta)^2}{(\alpha+\beta)(\alpha+\gamma)(\beta+\gamma)}$$

where, as previously noted, $\alpha=R_1C_1\beta=R_2C_2$ and $\gamma=R_3C_3$.

This is the expression for the quantum-noise power portion of the denominator of the overall S/N ratio which is to be maximized.

2. Thermal Noise

The determination of the expression for the thermal-noise power is similar to that of the quantum-noise power. The only difference in the process is a manipulation of the equivalent input circuit to make it like that used for the quantum-noise and signal inputs. The thermal noise is that generated in the resistor $R_1$ of FIG. 1. The usual equivalent circuit for this type of noise, as given in *Information Transmission, Modulation and Noise*, Schwartz, McGraw-Hill, 1959, is a voltage source with a RMS value as follows:

$$18\quad V_{TN}=\sqrt{4R_1kT\Delta f}$$

where: $k$ is the Boltzman constant, $T$ is the absolute temperature, the subscript $TN$ denotes thermal noise and $\Delta f$ is the signal bandwidth.

This voltage is in series with the resistor, $R_1$, generating the noise. By using Norton's theorem, this is changed to a current source with a value equal to $\sqrt{(4kT/R_1\Delta f}$ in parallel with $R_1$. Thus, the circuit to be utilized in determining the output thermal-noise power is FIG. 1, with this value of input current. The spectral distribution for this type of noise is white. Thus, for this case, simply substitute $\sqrt{(4kT/R_1)\Delta f}$ for $I_{IN}(s)$ in 3, instead of $\sqrt{2I_oe'\Delta f}$ as was done for the quantum-noise where: $t_{max}\le t_o$, and the output load resistance is assumed to be 1 ohm. This is the relationship to be maximized.

Design Steps for the Receiver

Step I

Inspection of equation 20 leads to the first step in obtaining the maximum value of the S/N ratio. In particular, the S/N ratio is dependent on the term: $(R_1/I_{Io}R_1+2kT)$. It will increase asymptotically as $R_1$ increases and will decrease as $I_o$ increases. The values of $e'$ and $k$ are, of course, physical constants and T is constant for a given application. Therefore, the S/N value due only to the term $(R_1/I_oe'R_1+2kT)$ is essentially a function of $R_1$ only.

Figure 3:
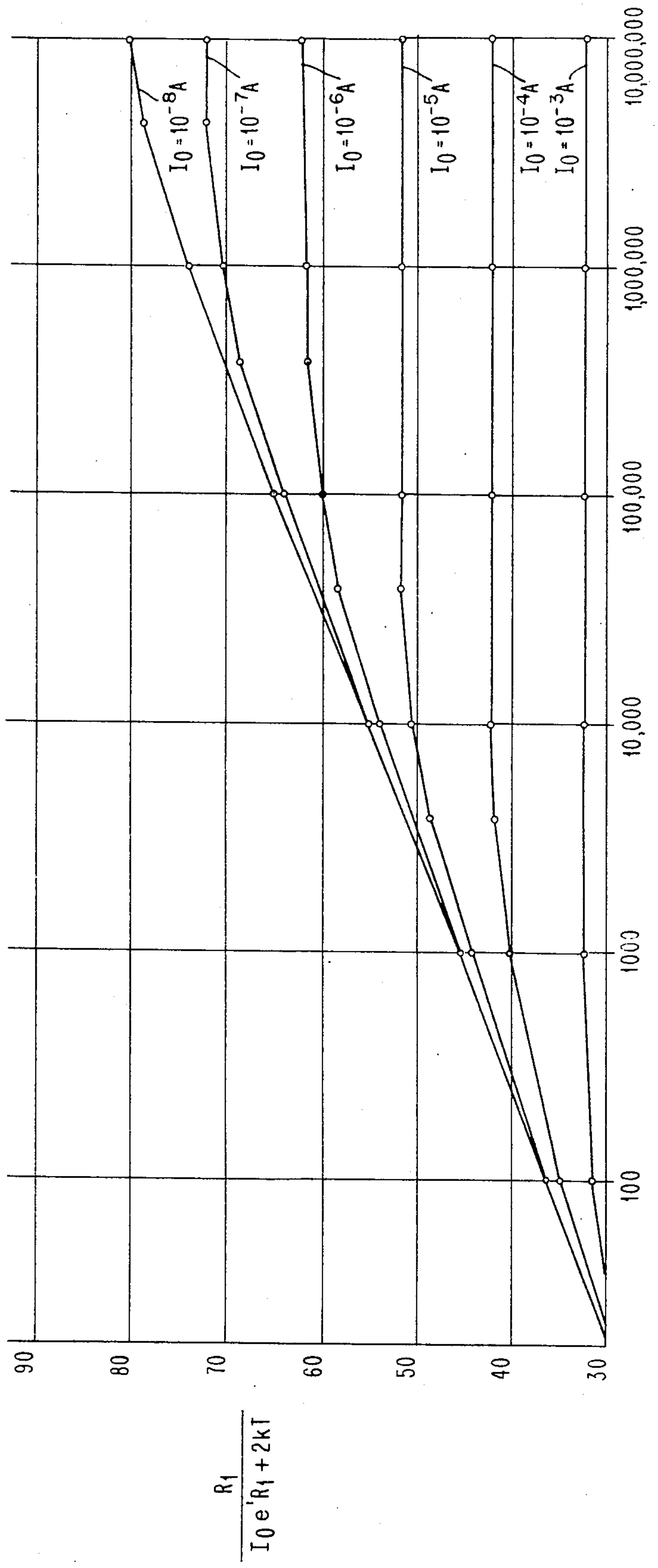
FIG. 3 is a graph of the term $(R_1/I_oe'R_1 + 2kT)$ of equation 1 versus $R_1$ for various values of $I_o$.

FIG. 3 is a plot of the term $(R_1/I_oe'R_1+2kT)$ versus $R_1$ for values of $I_o$ from $10^{-3}$ to $10^{-8}$ amperes. For these values of $I_o$, it may be seen that the term increases until it reaches an asymptote; i.e., an increase in $R_1$ causes the term to increase until $R_1$ reaches a certain value after which the term remains essentially constant. The value of $R_1$ which maximizes the term depends on $I_o$. For example, in FIG. 3 for $I_o=10^{-4}$ amperes, the term $(R_1/I_oe'R_1+2kT)$ becomes asymptotic at around $R_1=10^4$ ohms. Any further increase in $R_1$ results in a negligible increase in the term. Therefore, in equation 20, the object is to choose $R_1$ to have at least the value at which the term $(R_1/I_oe'R_1+2kT)$ becomes asymptotic. For $I_o=10^{-4}$ amperes, $R_1=10^4$ ohms.

Having fixed $R_1$, the value of $\alpha$ in equation 20 is also fixed because $\alpha=R_1C_1$ and $C_1$, the capacitance of the detector, is a function of the particular detector used.

Step II

The next step in the maximization process involves the design of the optimum values of $\beta$ and $\gamma$, the bandwidth-determining factors.

To carry out this calculation, it is convenient to turn to computerized computations. Equation 20 has been examined for maximum S/N by varying $\beta$ and $\gamma$ with the other parameters fixed. The programming for this kind of analysis is simple, and may be carried out conveniently on almost any digital computer designed for scientific type calculations. The programming for this application has been carried out in the IBM APL/360 language. This is a well known programming language and is fully explained in Berry, "APL/360 Primer", IBM Technical Publications, 1969. Computations may be carried out with an APL/360 terminal.

This kind of analysis indicates that equation 20 always reaches a near maximum at a point on the line $\beta=$ $\gamma$. Therefore, equation 20 can be further simplified by allowing $\beta = \gamma$.

For $\beta$ and $\gamma$, equation 20 becomes:

(21)

$$\left[\frac{S}{N}\right]_{\beta=\gamma} = A^2 \frac{R_1}{I_o e' R_1 + 2kT} \frac{4\beta(\alpha+\beta)^2}{(\alpha-\beta)^4} \left[\alpha\left(e^{\frac{-t_{max}}{\alpha}} - e^{\frac{-t_{max}}{\beta}}\right) - \left(\frac{\alpha-\beta}{\beta} t_{max} e^{\frac{-t_{max}}{\beta}}\right)\right]^2$$

where $t_{max} \leq t_o$.

It will be noted that there is an indeterminancy in equation 20 for $\beta = \gamma$. However, by applying L'-Hopital's Rule it is found that equation 20 is in fact continuous at $\beta = \gamma$.

Conceptually, the calculations involved in computing the values of $\beta$ (hence $\gamma$) to maximize equation 21 are straightforward. Initially, the value of $t_o = t_{max}$ is specified. In this invention, as noted previously, the value of $t_o$ is assumed to be known precisely. Similarly, the value of $I_o$ is fixed, depending on the particular type of detector used and the input signal characteristics. Then, the values of $R_1$ and $\alpha$ are designed as described in Step I above.

Having specified the values of $t_o$, $I_o$, and having designed $R_1$ and $\alpha$, the value of $\beta$ which maximizes S/N in equation 21 is determined by performing claculations for S/N over a series of values of $\beta$. The programming involved in this step is quite simple.

As previously noted, in the great majority of practical cases, the value of $t_{max}$ is precisely $t_o$, the input pulse width. However, this is not necessarily the case, as there may be a value of $t$ lying between o and $t_o$ which is in fact $t_{max}$. A procedure for determining the value of $t_{max}$ is to assume initially that $t_{max} = t_o$ in equation (21). Then, solve equation 21 for $\beta$, all other parameters having been specified. Having found the numerical value of $\beta$ which maximizes equation 21, this value is substituted in equation 7 for $\beta$ and $\gamma$. All other parameters on the right hand side of equation 7 are already known, except $t_{max}$. Equation 7 is then solved for values of $t \leq t_o$ and $v_o(\max)$ is determined which occurs at a particular value of $t$, which is $t_{max}$. This step is easily done by a suitable computer program. In the usual case, i.e., when $t_{max} = t_o$, the maximum value of S/N remains as calculated from equation 21. In the rare case where $t_{max}$ is some value of $t < t_o$, a new value of $\beta$ which maximizes equation 21 is computed.

Figure 4:
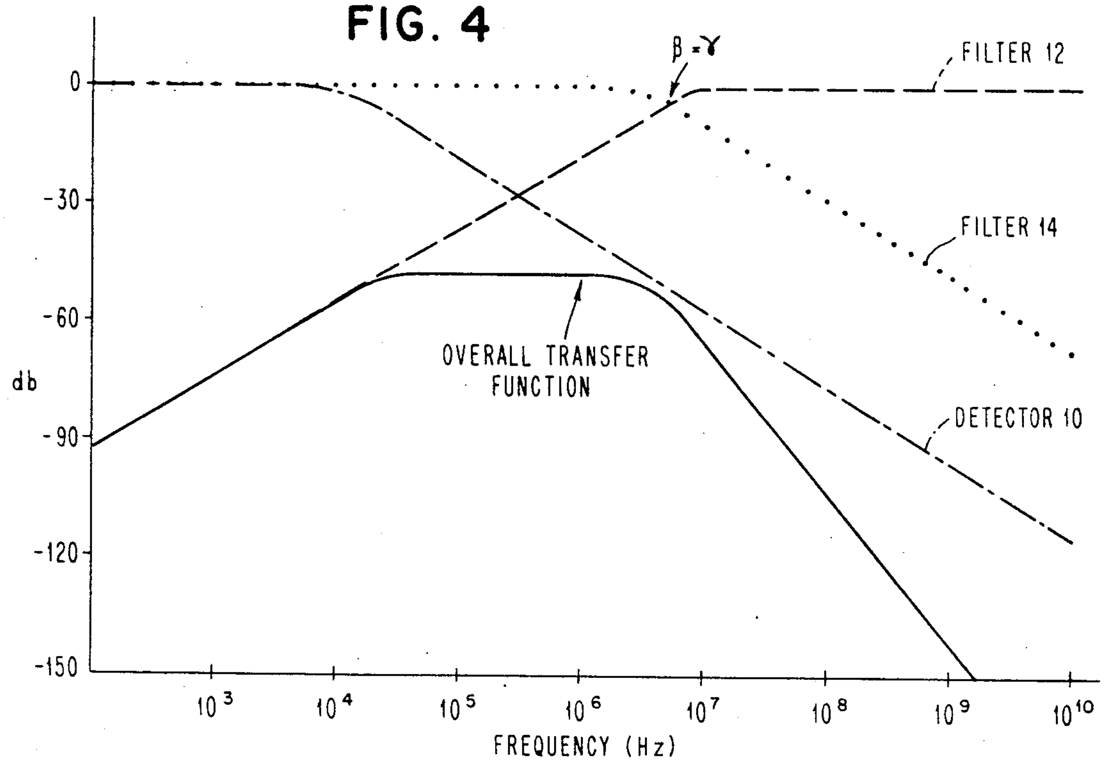
FIG. 4 shows the transfer functions of the individual components and of the overall receiver of the present invention.

FIG. 4 illustrates typical absolute values of the power transfer functions for the component parts of the receiver of FIG. 1 and the resulting overall transfer function designed according to the present invention. In this particular design, the duration of the input pulse, $t_o$, is 100 nanoseconds. The detector characteristics are such that $C_1$ is 20 picofarads and $I_o$ is $10^{-8}$ amperes. Using the design procedure described above, $R_1$ is 397 kilohms and $\beta$ and $\gamma$ are $31 \times 10^{-9}$ seconds. It will be seen that photodetector 10 has a low-pass characteristic with a relatively low 3 db roll-off frequency due to the high value of $R_1$. Filters 12 and 14 have high-pass and low-pass characteristics, respectively, with their 3 db points intersecting at $5.14 \times 10^6$ Hz. The overall characteristic is bandpass.

In operation, the optical pulse detected by detector 10 is passed through the low-pass filter $R_1C_1$ having a large time constant $\alpha$. The detected pulse is then passed through the bandpass filter (filters 12 and 14) comprising $R_2C_2$ and $R_3C_3$ which compensates for the large time constant of the input filter $R_1C_1$.

FIGS. 5 and 6 are oscilloscope traces of the output pulses from a conventional photodetector receiver of the prior art and from the photodetector incorporating the bandpass filter of the present invention. In both figures the input pulse width, $t_o$, is 100 nanoseconds and the same input amplifier ($A_1$ of FIG. 1) is employed. Thus, the input amplifier noise is the same for both cases. This amplifier has only a moderately low noise voltage.

Figure 5A:
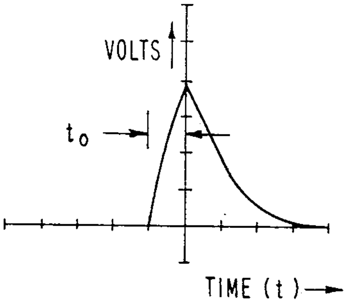
FIGS. 5 and 6 are tracings of oscilloscope patterns of output signals which illustrate the improved results of the inventive direct-detecting receiver over the prior art receiver.
Figure 5B:
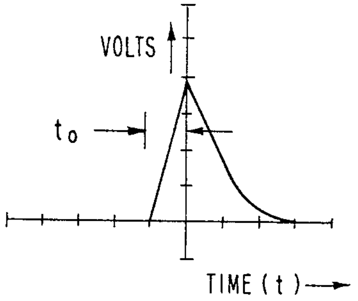
Figure 6A:
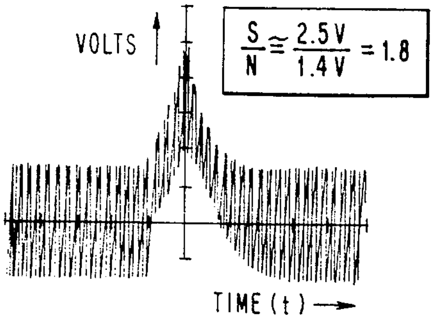
Figure 6B:
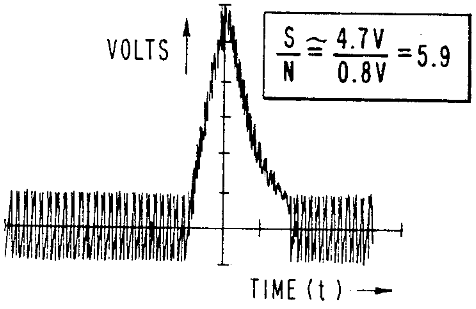

Output pulses for the conventional receiver are illustrated in FIGS. 5A and 6A; output pulses for the receiver of this invention are illustrated in FIGS. 5B and 6B.

For the conventional photodetector receiver, low-pass post-detection filtering is used to limit the amplifier noise. The bandwidth of this filtering is sufficient so as not to limit the bandwidth required for the signal, as determined by the conventional $\alpha$ time constant ($\alpha = 0.794\ t_o$).

In FIG. 5, the amplitude of the input pulse is set at a high value, thereby making the input S/N high. This is done in order to facilitate the comparison of the output signal waveforms. It may be seen that the waveforms are almost alike, indicating that the "effective time constant" of the overall circuit for the present invention (FIG. 5B) is nearly that for the conventional detector (FIG. 5A). This occurs even though $\alpha$ for the inventive receiver has been made much larger than $\alpha = 0.794\ t_o$, in order to improve the S/N ratio. Thus, even though the fast response of the detector is destroyed at the input by increasing $R_1$ in order to improve the S/N ratio, the overall effect is that the response is recovered by the proper choice of $\beta = \gamma$.

In FIG. 6, the input S/N has a low value and demonstrates the improvement in S/N ratio. The signal-to-noise improvement of the signal in FIG. 6B compared with the signal in FIG. 6A is 10.4 db. If no amplifier noise were present the improvement would be even greater, approaching the ideal level of a matched filter. For shorter pulse widths, the increase in S/N ratio becomes even greater. This has great significance for future applications, since as the capability of handling shorter pulses increases, this technique will become more applicable.

SUMMARY OF THE DETAILED DESCRIPTION

There are three basic design parameters that in the usual case serve to define the problem. These are: input pulse width $t_o$, the capacity, $C_1$, of the input low-pass circuit 10 and the D.C. current, $I_o$, through the photodetector.

The value of $t_o$ must be known prior to the design procedure. For the usual laser receiver, $t_o$ will be less than 100 nanoseconds. $C_1$ is fixed by the choice of photodetector and its biasing, the input capacitance of the first amplifier $A_1$ and the capacity of the input cabling from the detector to the amplifier. It is desirable to make $C_1$ as small as possible but, in practice, this minimum value will be of the order of 10 to 20 pf. $I_o$ is the factor on which the quantum noise depends and is a function of the dark current, background noise and D.C. component of the detected signal pulse. It has been pointed out that $I_o$ should be as small as possible; values for $I_o$ of less than $10^{-6}$ amperes are achievable.

With $t_o$, $C_1$ and $I_o$ specified, the first step in the procedure is to determine $R_1$, which specifies $\alpha$, the input time constant. In the conventional approach, $R_1$ is fixed by the maximizing relationship $R_1C_1 = 0.794\ t_o$. However, for small values of $t_o$ and a fixed minimum value of $C_1$, this results in a $R_1$ so small that the term $(R_1/I_oe'R_1 + 2kT)$ does not approach its limit of $(1/I_oe')$. This results in an output S/N ratio that can be many db below that of a matched filter. In the present invention, on the other hand, $R_1$ is made large enough to cause the term $(R_1/I_oe'R_1 + 2kT)$ to approach its limit. In practical cases, it may not be possible to make $R_1$ physically as large as desired. However, the concept remains the same, and in these instances $R_1$ is made as large as possible.

Having established the value of $R_1$, $\alpha = R_1C_1$ is fixed thereby. The input low-pass circuit 10 of FIG. 1 is thus a low-pass filter with a 3 db cut-off radian frequency point, $\omega_C$ , much lower in frequency than for the conventional case, because $\omega_C = (1/\alpha) = (1/R_1C_1)$ and $R_1$ has become much larger. In addition, the low-pass transfer function, $H_1(j\omega) = (R_1/1 + j\omega R_1C_1)$, has increased in amplitude because of the increase in $R_1$. Hence, the effect of increasing $\alpha$ for the present invention is to move the 3 db cut-off radian frequency point in toward a lower frequency, but at the same time to increase its amplitude over prior-art detectors.

With $t_o$, $C_1$, $I_o$, $R_1$ and $\alpha$ fixed, the next step is to determine the time constants $\beta$ and $\gamma$ for the cascaded high-pass and low-pass dividers, 12 and 14, respectively. $\beta(R_2C_2)$ always equals $\gamma(R_3C_3)$ as determined from the mathematical maximization calculation in equation 20. The specific values of $\beta$ and $\gamma$ are then calculated by solving equation 20 for various values of $\beta$ and $\gamma$ until those values which maximize the equation are obtained. As has been pointed out, the calculations are tedious and, in practical cases, must be done with the aid of a computer. However, the programming is simple and there are many computers capable of doing the calculations. This completes the procedure.

The apparatus which results from the above design procedure is a high-pass divider 12 and a low-pass divider 14 which, in cascade, produce a bandpass filter having a peak at a frequency of $\omega_{c\beta} = \omega_{c\gamma}$. This bandpass filter in cascade with the input low-pass filter 10 produces an overall transfer function that is bandpass. Its characteristics are similar to the low-pass transfer function for the conventional detector which has the condition $\alpha = 0.794\ t_o$ imposed. Thus, the bandpass technique produces an overall transfer function that is about equivalent to that produced by the conventional approach, but achieves this with a larger value of $R_1$, which accounts for the significant increase in output S/N ratio at amplitude detector 16. Note that it is required only that $\beta$ and $\gamma$ substantially equal a certain value; one is free to choose $R_2$, $C_2$, $R_3$ and $C_3$ as desired, subject only to the constraint that the products $R_2C_2$ and $R_3C_3$ be as specified.

In the preferred embodiment of FIG. 1, three amplifiers $A_1$, $A_2$ and $A_3$ are used, which are considered to be ideal from the viewpoint of input and output impedance, frequency response and noise; but it has been pointed out that the input impedance of $A_1$ forms a part of the input RC circuit. This input impedance could very well be the limiting factor in determining how small $C_1$ and how large $R_1$ can be made. In practice, $A_2$ and $A_3$ could be eliminated. $A_1$ would have to be of the low-noise variety. At the output of amplifier $A_1$, the frequency characteristics of the cascaded high-pass and low-pass dividers could be combined. This means that the amplifier would be peaked at $\omega_{C\beta} = \omega_{C\gamma}$ as defined above.

While the invention has been particularly shown and described with reference to a preferred embodiment thereof, it will be understood by those skilled in the art that various changes in form and detail may be made therein without departing from the spirit and scope of the invention. For example, the bandpass filters shown in FIG. 1 are preferably composed of resistances and capacitances. However, it is obvious that various combinations using inductances as well could be used.

What is claimed is:

1. A method for constructing a direct detecting optical pulse receiver having an optical detector with a load resistance $R_1$, a junction capacitance plus shunt capacitance $C_1$, and a time constant $\alpha$ equal to $R_1 C_1$, a high-pass filter with a time instant $\beta$ and a low-pass filter with a time constant $\gamma$, said high-pass and low-pass filters being connected in cascade to the output of said optical detector, comprising the steps of:

setting said resistance $R_1$ to a value which makes the term $(R_1/I_{1o}e'R_1 + 2kT)$ substantially equal to $1/I_oe'$, where $I_o$ is the D.C. current of the detector, $e'$ is the charge on the electron, $k$ is Boltzmann's constant and $T$ is the temperature of the detector;

setting the time constants $\beta$ and $\gamma$ equal to each other at a value which substantially maximizes the relationship:

(21)

$$\left[\frac{S}{N}\right]_{\beta=\gamma} = A^2 \frac{R_1}{I_o e' R_1 + 2kT} \frac{4\beta(\alpha+\beta)^2}{(\alpha-\beta)^4} \left[\alpha\left(e^{\frac{-t_{max}}{\alpha}} - e^{\frac{-t_{max}}{\beta}}\right) - \left(\frac{\alpha-\beta}{\beta} t_{max} e^{\frac{-t_{max}}{\beta}}\right)\right]^2$$

where S/N is the signal-to-noise ratio and is defined as the peak signal output voltage squared divided by the output load resistance of the receiver, A is the amplitude of the input optical current pulse and $t_{max}$ is the time at which the peak signal output voltage occurs, whereby the signal-to-noise ratio of the optical receiver is maximized.

* * * * *

PO-1050
(5/69)

UNITED STATES PATENT OFFICE
CERTIFICATE OF CORRECTION

Patent No. 3,729,633 Dated April 24, 1973

Inventor(s) Stephen Eros and Paul M. Thrasher

It is certified that error appears in the above-identified patent and that said Letters Patent are hereby corrected as shown below:

Column 6, (11), line 39, "$R_2C_2ab3C_3$." should read --$R_2C_2R_3C_3$.--

Column 8, line 26, ""$(R_1/I_{1o}R_1+$" should read -- $(R_1/I_o^{e\prime} R_1+$ --.

Lines 52-54 should precede Equation (21).

Signed and sealed this 7th day of January 1975.

(SEAL)
Attest:

McCOY M. GIBSON JR.
Attesting Officer

C. MARSHALL DANN
Commissioner of Patents

WA9-70-003